United States Patent [19]

Scaggs

[11] 3,769,611

[45] Oct. 30, 1973

[54] NOISE REDUCTION SYSTEM

[75] Inventor: Lee Edward Scaggs, Mountain View, Calif.

[73] Assignee: CMX Systems, Inc., Sunnyvale, Calif.

[22] Filed: Aug. 25, 1971

[21] Appl. No.: 174,673

[52] U.S. Cl. ...................... 333/14, 325/65, 328/145, 330/126, 333/29, 333/70 R

[51] Int. Cl. ............................................ H04b 1/64

[58] Field of Search ........................ 333/6, 14, 28 R, 333/28 T, 70 R; 324/77 R, 77 H; 179/1 P; 325/46, 65

[56] References Cited

UNITED STATES PATENTS

| | | | |
|---|---|---|---|
| 3,585,311 | 6/1971 | Berkley et al. | 325/65 X |
| 2,287,077 | 6/1942 | Abraham | 333/14 |
| 2,716,733 | 8/1955 | Roark | 333/28 R X |
| 1,944,297 | 1/1934 | Nyquist | 333/6 |
| 2,851,661 | 9/1958 | Buland | 333/6 X |
| 3,022,504 | 2/1962 | Stroud et al. | 333/6 X |

*Primary Examiner*—Paul L. Gensler
*Attorney*—Karl A. Limbach, George C. Limbach, John P. Sutton, Thomas A. Gallagher, J. William Wigert, Jr. and Gerald P. Parsons

[57] ABSTRACT

A noise reduction system is provided for reducing the effects of noise on low level signals sent across a transmission path. Input signals to be transmitted are logarithmically amplified such that low level signals are strengthened relative to higher level signals. At the opposite end of the transmission path the signals are logarithmically de-emphasized to reconstitute the original input signals. An improved band splitter divides the input signals into a plurality of sub-bands wherein all signal components in each sub-band have equal time delays associated therewith. Logarithmic amplification is provided for each sub-band.

22 Claims, 7 Drawing Figures

INVENTOR.
LEE EDWARD SCAGGS
BY Limbach, Limbach and Sutton
ATTORNEYS

INVENTOR.
LEE EDWARD SCAGGS
BY Limbach, Limbach and Sutton
ATTORNEYS

INVENTOR.
LEE EDWARD SCAGGS
BY *Limbach, Limbach and Sutton*
ATTORNEYS

INVENTOR.
LEE EDWARD SCAGGS

BY

ATTORNEYS

INVENTOR.
LEE EDWARD SCAGGS

BY
Limbach, Limbach and Sutton
ATTORNEYS

INVENTOR.
LEE EDWARD SCAGGS
BY
Limbach, Limbach and Sutton
ATTORNEYS

NOISE REDUCTION SYSTEM

BACKGROUND OF THE INVENTION

The invention relates to noise reduction systems and in particular, to a system for reducing the effect of noise introduced in transmission systems.

When transmitting signals across a transmission path, such as a co-axial cable, a telemetry link or any other transmission system, it is desirable to reduce the effect of noise introduced in the transmission path. For purposes of this patent application, transmission path also includes the recording or playback path within a record/play recording system such as magnetic video tape system.

One well-known means for reducing the effect of such noise is the use of pre-emphasis and de-emphasis circuitry. In many systems of communication the magnitude of the modulating wave varies statistically as a function of frequency. For example, in voice and many other types of signals, the energy at the upper end of the signal spectrum is a great deal less than at the lower end. To take advantage of this, at the transmitting end of the signal is first passed through a network that leaves the low signal frequencies unaffected but increases the higher signal frequencies. This process is called pre-emphasis.

In order to restore the signal components to their proper relationship, the inverse process is carried out at the receiver. This is called de-emphasis. As a result, the output signal is not appreciably altered by the addition of pre-emphasis and de-emphasis networks. However, even though the signal is unaffected, noise will be affected because the de-emphasis network is in the significant noise path. For a more detailed description of pre and de-emphasis reference is made to *Modulation Theory* by Harold S. Black, D. Van Nostrand, 1953, beginning at p. 228.

For example, if the lowest level signals to be transmitted are at −42db, the highest level signals being at odb, then obviously, noise having a level of around −42db will substantially interfere with the information signals being transmitted. By pre-emphasizing or boosting the lower level signals, i.e., for example to −30db, the −42db noise signals will have considerably less adverse effect on these signals. At thr receiving end of the transmission line the low level signals are de-emphasized back to their original value, i.e., back to −42db. Consequently, the −42db noise signals are reduced down to −54db.

It is also old in the art to split incoming signals into a plurality of passbands for operation of a noise reduction system. This is done so that higher level signals in one band do not prevent noise reduction in other bands having lower level signals.

Unfortunately there are many drawbacks to these prior art noise reduction schemes. For example, in many applications, such as video applications, it is necessary to maintain equal time delay for all of the signals in the passband or channel. Prior art band splitting circuits have been deficient in their inability to maintain equal time delays for signals within and among each of the resulting channels. In an application such as video television transmission or video recording and playback, it is absolutely crucial to maintain linear phase circuits or else unaccepatable distortion will result. In other applications such as audio processing, such linear phase circuits are not required since the ear is unable to differentiate between phase shifts.

In one prior art noise reduction system limiting circuits are used in conjunction with LC filters for band splitting. These limiters are directly coupled to the filters, and as a result the charge and discharge requirements of the capacitors with the filter circuits cause undesirable distortions. The discharge or recovery, particularly in video applications, are unacceptable since they appear as streaks on the television screen.

Another undesirable effect with the use of limiter circuits is that continuous pre-emphasis and de-emphasis on stable fixed bands cannot be provided. Rather, the limiters act to simply cut the filters in and out of the circuit. depending upon the cut-off limit of the limiters. Further, the hard limiting of voltage source from back-to-back diode limiters introduces undesirably high harmonic components.

SUMMARY OF THE INVENTION

In accordance with the present invention, a signal to be transmitted over a transmission path or a network is divided by an improved band splitter into a plurality of sub-bands or channels each providing output signal components having equal time delay with respect to all the others. As a part of the improved band splitter suitable time delays are provided in each bandpass circuit so that the total delay time of each channel is substantially the same.

The outputs from each of the channels is sent to a pre-emphasis or compressor circuit. This circuit comprises a plurality of channels, one for each of the signal channels. Each channel comprises a non-linear, logarithmic amplifier (log amp) for amplifying the low level signals relative to higher level signals and a linear path around the log amp and summed with the output of the log amplifier. The output from each of these channels is summed and then transmitted across the transmission system or path to a similar band splitting circuit on the output end of the transmission path. The latter band splitting network also provides equal time delays for each of the signal channels.

The signals are again split into a plurality of channels and are sent to a de-emphasis or expander circuit which provides the inverse function of the logarithmic compressor circuit. This circuit reduces the level of the lower level signals in each channel in precisely the opposite way that the compressor circuit amplifies the lower level signals. The outputs from the respective channels of the logarithmic expander circuit are summed to provide the final output signal which is substantially identical with the original input signals.

As explained above, the band splitter of the present invention includes a plurality of channels or bandpass circuits. Each of the channels provides different filtering of the incoming signal. In one embodiment, each of the channels includes a filter with successive channels having filters having a higher upper cut-off frequency. Each of the filters has a different time delay associated with it. In order to insure constant linear phase relationship from the output of each of the bandpass circuits, suitable time delays are added to each of the selected bandpass circuits so that the delay times for each bandpass is the same.

In the preferred embodiment the bandpass filters are created by the use of only low pass filters. The outputs of two filters differeing in cutoff frequency are applied with opposing phase to a summing point or with the same phase to differential inputs of an amplifier to obtain the bandpass characteristics.

In the frequency range where the filters are both passing signals, the output from the summing circuit is zero, the summing circuit being arranged so that the signals cancel each other out. However, above the cut-off frequency of one filter, but below the cut-off frequency of the other, an output from the summing circuit is provided. This frequency range constitutes the passband. By inputting pairs of successive filter outputs to other summing circuits, the input signals are split into a plurality of mutually exclusive subbands or channels. Additionally, by providing appropriate time delays in each channel as explained above the output signals from each summing circuit maintain a linear phase relationship.

This method of pre-emphasis differs from prior art systems in that it is automatically and instantaneously adaptive, rather than assuming a noise distribution and assuming signal levels to vary in amplitude according to frequency in some given manner.

These and other features and advantages will become more apparent upon a perusal of the following specification taken in conjunction with the accompanying drawings wherein similar characters of reference refer to similar structures in each of the several views.

DESCRIPTION OF THE PREFERRED EMBODIMENTS

Figure 1:
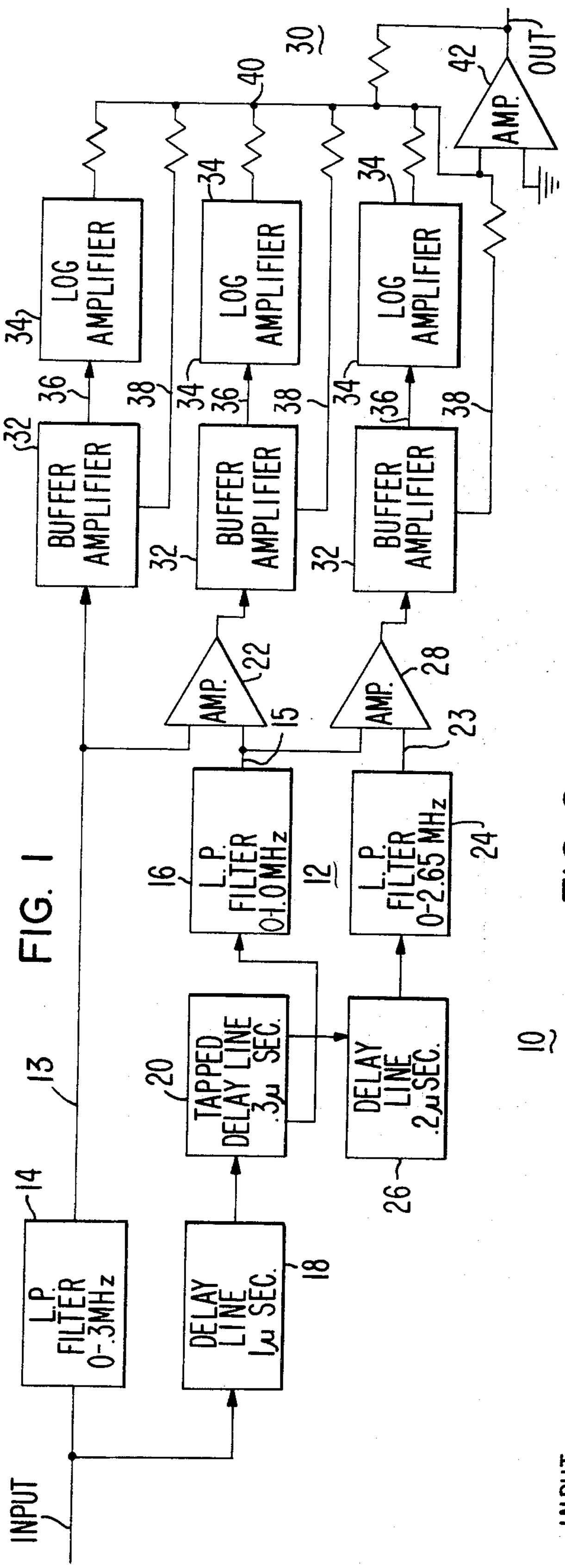
FIGS. 1 and 2 are block schematic diagrams of one embodiment of the noise reduction system of the present invention.
Figure 2:
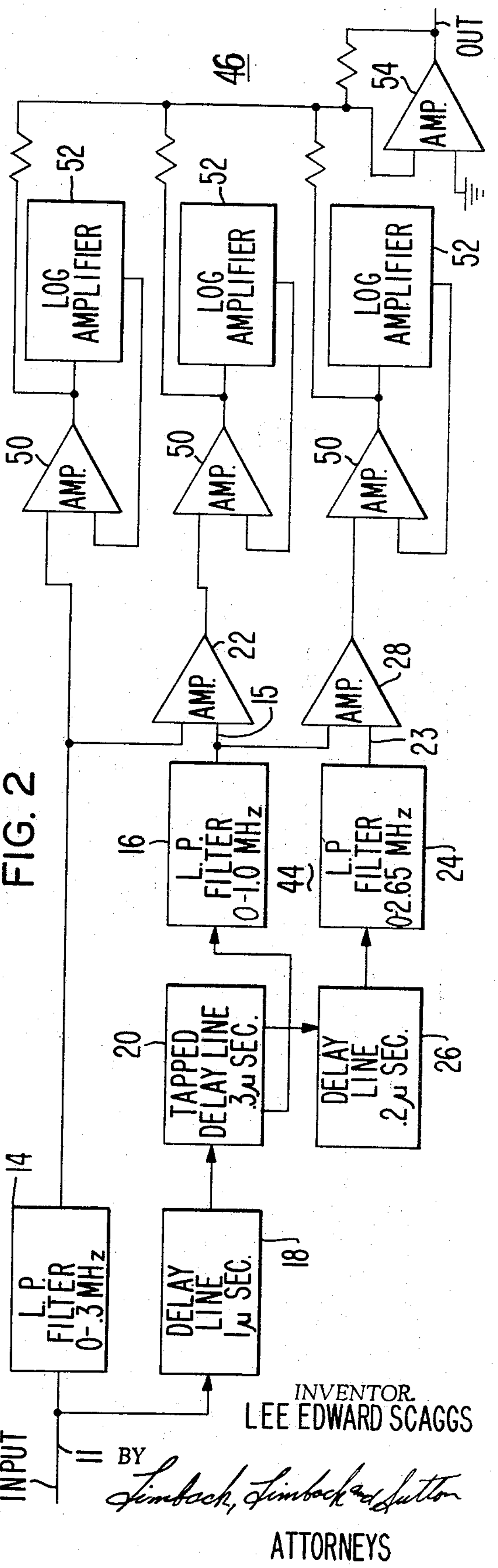

FIGS. 1 and 2 are block schematic diagrams of transmitter and receiver portions, respectively, of a noise reduction circuit 10 in accordance with the present invention. Referring particularly to FIG. 1, Input signals to be transmitted over a transmission network or system (not shown) are first introduced into a band splitter circuit 12. This circuit reduces the input band frequencies into a plurality of independent sub-bands or channels of frequencies.

In the particular embodiment illustrated and described, three such channels are provided. It is desirable to provide as many sub-band circuits as possible. This is because the presence of a high level signal in any one band effectively eliminates the effect of the operation of the noise reduction circuit 10. By dividing the input signals into a plurality of sub-bands, other low level signals are pre-emphasized in those sub-bands not having high level signals.

In accordance with the invention a first bandpass circuits includes a 0–0.3 MHz low pass filter 14. Signals which are sent to the filter 14 pass through the filter 14 as long as the frequencies thereof are in the range of 0 to approximately 0.3MHz. A second bandpass circuit, with a frequency range from 0.3 to 1.0 MHz, includes a 0–1.0 MHz low pass filter 16 and delay means comprising a first delay line 18 and second delay line 20 and the previous 0–0.3 MHz filter 14 feeding differential amplifier 22. A third bandpass circuit having a passband of 1.0 to 2.65 MHz includes a 0–2.65 MHz low pass filter 24 and the previous 0–1.0 MHz filter 16 feeding differential amplifier 28. In addition to time delays provided by a delay 18 and 20 a third delay line 26 is provided in the third bandpass circuit.

Figure 3A:
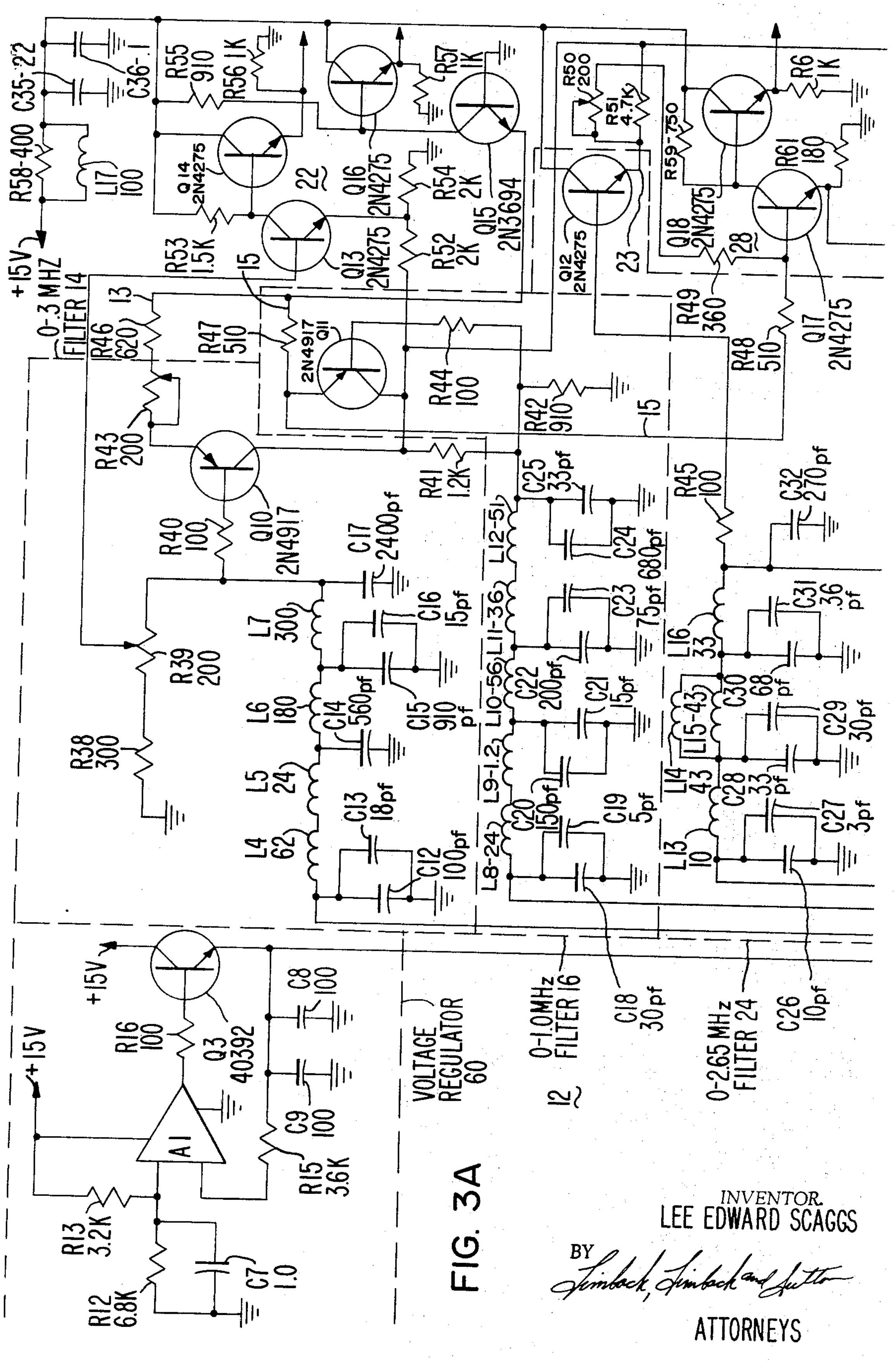
FIGS. 3A and 3B are detailed schematic diagrams of one particular embodiment of the band splitter forming a part of the systems disclosed in FIGS. 1 and 2.
Figure 3B:
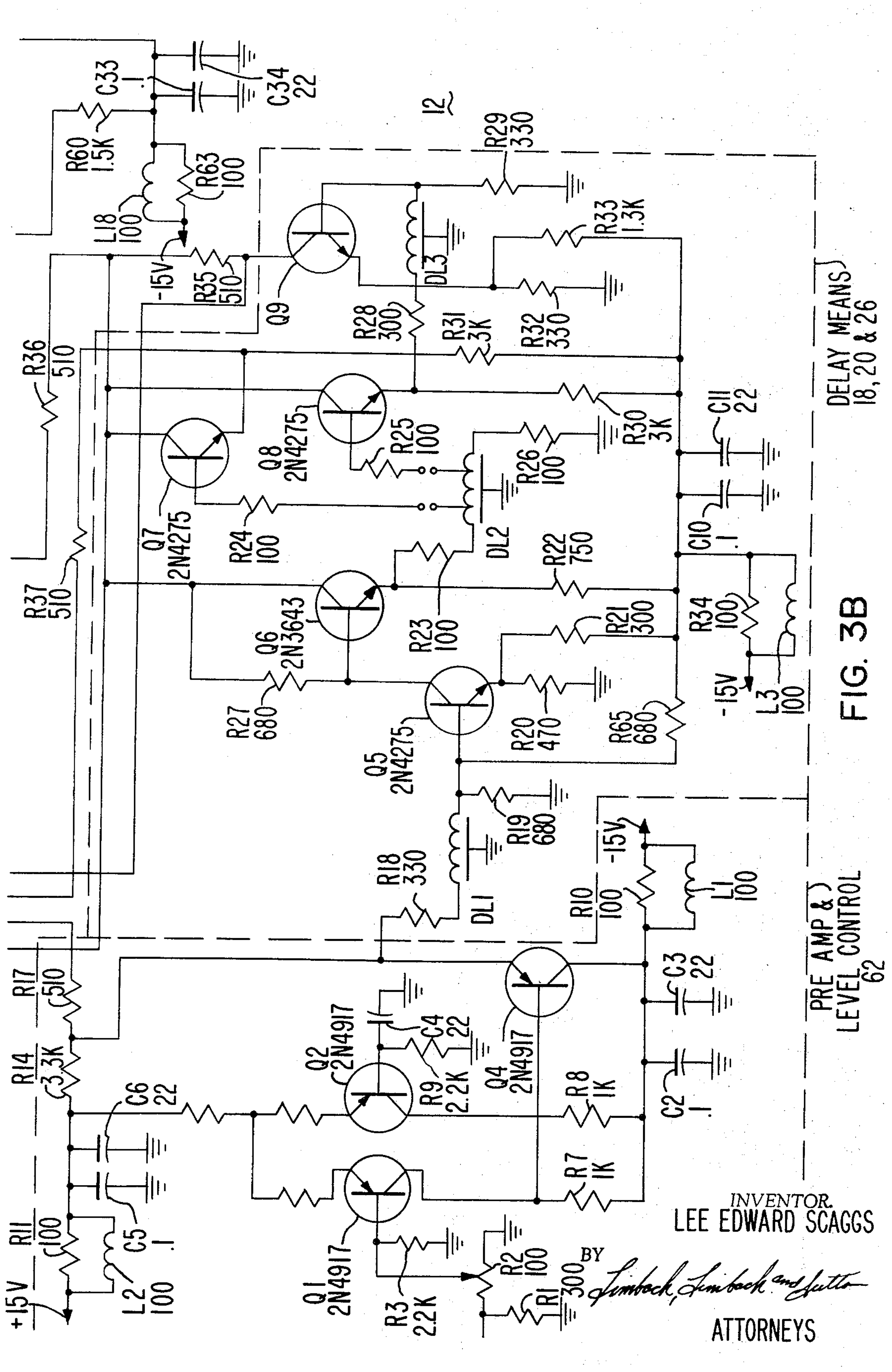

Filters such as filters 14, 16, and 24 inherently have different time delays associated with each. The time delays are inversely related to the band-width of the filters. For example, in the embodiment illustrated in FIG. 3, low pass filter 14 has a 1.515 microsecond time delay, low pass filter 16 has a 0.450 microsecond delay, and filter 24 has a 0.170 microsecond delay. In accordance with the present invention, suitable time delays are chosen in the respective bandpass circuits so that the frequency components of the outut signal from each of the bandpass circuits have equal time delay. Thus, for example, the delay means 18 and 20 have values chosen so that the combination of the time delay associated with filter 16 and the delay means 18 and 20 is equal to the time delay associated with the fliter 14. Similarly the combination of delay means 26 and the time delay associated with filter 24 are equal to the time delays of the other channels.

The output 15 from the low pass filter 16 is sent to a summing circuit, which, in the embodiment illustrated, comprises a differential amplifier 22. Also provided to the differential amplifier 22 is the output 13 from the filter 14. The output 23 from filter 24 is sent to a second summing circuit such as differential amplifier 28. Also provided to differential amplifier 28 is an output from filter 16.

In operation, input signals are sent to the three bandpass circuits, i.e., to the 0–0.3 MHz circuit, the 0–1.0 MHz circuit, and to the 0–2.65 MHz circuit. As explained above, suitable time delays 16, 18 and 26 are provided in those circuits so that each of these circuits have a linear phase characteristic. Signals having frequencies from 0–0.3 MHz are passed through filter 14 to the pre-emphasis or compressor circuit 30 and also to the differential amplifier 22. Signals in the frequency range of from 0–1.0 MHz, after being delayed by delay lines 19 and 20, are provided by filter 16 to the differential amplifier 22.

In the preferred embodiment, the phase of the outputs from filters 14 and 16 are opposite to one another. By proper selection of circuit values, the currents from filters 14 and 16 will cancel out each other for signals in the 0–0.3 MHz range. Thus the output from the summing circuit 22 is 0 so long as the signals are in the range of 0–0.3 MHz. Where there are signals above 0.3 MHz, there is no longer an output from filter 14. Hence, tthere is no oppositely phased current to subtract from the output of filter 16 hence an output is provided from summing circuit 22 above 0.3MHz. Thus this circuit acts as bandpass filter, having a frequency range of 0.3–1.0 MHz.

In a similar manner low pass filter 24 passes signals between 0–2.65 MHz after being suitably delayed by time delays 18, 20 and 26 to the summing circuit 28. The 0–1.0 MHz signals from filter 16 are also sent to the summing circuit 28. In the preferred embodiment, the respective outputs from the filters 16 and 24 are out of phase with one another such that there is no output from the summing circuit 28 for signals in the frequency range of 0–1.0 MHz. In this frequency range, the currents from the filters 16 and 24 cancel each other out. Above 1.0 MHz, however, there is substantially no output from filter 16 and hence the output from the summing circuit 28 is provided by the output of filter 24. This arrangement thus acts as the bandpass filter for frequencies from 1.0–2.65 MHz and has a total time delay associated with it substantially identical with that for both the 0.3–1.0 MHz bandpass circuit and the 0.3 bandpass circuit The signals from the respective bandpass circuits of the band splitter circuit 12 are sent to the pre-emphasis or compressor circuit 30. The compressor 30 has three channels; one for each of the passband circuits. Each circuit includes a buffer amplifier 32 and a logarithmic amplifier 34. There are two outputs from buffer amplifier 32. One output 36 is provided to the log amplifier 34. A second output 38 bypasses the log amplifier 34 and is summed at the input 40 of amplifier 42 with the output from the logarithmic amplifier 34.

In accordance with the invention the logarithmic amplifier 34 in each of the bandpass channels increases the amplitude of low level signals while providing virtually no amplification of higher level signals. The amplification, as the name inplies, is applied logarithmically to the input signals provided to the buffer amplifier 32. In the embodiment described with reference to FIG. 4, the logarithmic amplifier 34 provides a 4 to 1 current increase of low level signals. Thus, for example, if the lowest level input signals are –42db (with the highest level signals at odb) the current from the log amplifier 34 for low level signals will be four times that of the same signals through line 38. In terms of db increase this means that the low level signals are boosted from –42db to –30db. Since this in effect reduces the dynamic range of the signals within the bandpass, the circuit is referred to as a compressor circuit. It should be understood, however, that the same result can be accomplished by decreasing the higher level signals relative to the low level signals.

Each of the bandpasses, i.e., 0–0.3 MHz and 1.0–2.65 MHz provide similar logarithmic compression to the signals provided through the respective bandpasses. As explained above, when high level signals are present in a bandpass channel the effect of the logarithmic amplification is unimportant and substantially all of the current through each of the bandpasses is provided through the output 38 from the buffer amplifier.

The compressed signals are summed at the input 40 of the summing amplifier 42 for transmission across the transmission network 11. As explained above, since the low level signals are boosted to a higher level prior to transmission down the transmission line, low level noise signals do not have as great of an effect on the low level signals as they would otherwise have.

Referring now to FIG. 2, at the receiving end of the transmission path 11, a band splitter circuit 44 takes the compressed bandpass signals and divides the transmitted signals into a plurality of channels in an identical manner as provided by the bandpass filter 12 which is shown in FIG. 1. The band splitter circuit 44 is substantially identical with the band splitter circuit 12 and provides in the embodiment illustrated, three output channels: 0–0.3 MHz, 0.3–1.0 MHz, and 1.0–2.65 MHz. As with the band splitter 12, signals through the respective channels are in equal time relationship with one another. Since the operation of the band spliter 44 is identical with that of band splitter 12, the same reference numerals are used, as used in describing the band splitter 12 in FIG. 1.

The signals from the respective bandpass circuits of the band splitter 44 are sent to a de-emphasis or expander circuit 46. This circuit is the compliment or inverse of the compressor circuit 30. It logarithmically reduces the lower level signals back to their original level. Each channel of the expander circuit 46 includes a differential amplifier 50 and a log amplifier 52. The latter is identical with the log amplifier 34 in the compressor circuit 30. The log amplifier 32 is in the feedback path of the amplifier 50 and, as is well known to those skilled in the art, such a feedback arrangement provides the inverse function of the output provided by the compressor circuit 30.

The output from each of the amplifiers 50 is then fed to a summing circuit, in this case an amplifier 54. The output from amplifier 54 is a signal substantially the same as the original signal.

Referring now to FIGS. 3A and 3B, 4 and 5A and 5B showing, schematically, one actual embodiment of the improved noise reduction circuit of FIGS. 1 and 2, the 0–1.0 MHz filter 16 (FIG. 3) is at the opposite or negative phase relative to the 0–0.3 MHz filter 14. The outputs 15 and 13 from these filters are provided at the emitter of Q15 which forms a part of summing circuit 22. The 1 MHz balance potentiometer R43 allows the adjustment of the two currents from filters 14 and 16 to be equal and being of opposite phase they cancel each other up to the 0.3 MHz cut-off frequency of filter 14. At this point the signal from filter 14 begins to cut out and, therefore, allows the signals from the 0–1.0 MHz filter 16 to pass through Q15. At 1.0 MHz the signals through filter 16 drop off, having thus effectively formed a filter having a bandpass of 0.3 MHz to 1.0 MHz. Q15 is used in common base configuration avoiding phase inversion so that all three bandpass filters provide output of the same phase. The direct output of the 0–0.3 MHz filter 14 is taken off through a level control potentiometer R39. The output goes directly to the compressor circuit after passing through a two-stage amplifier formed by Q13 and Q14.

Signals from the 0–1.0 MHz filter 16 having a negative phase, and signals from the 0–2.65 MHz filter 24 having a positive phase relative thereto, are balanced by adjusting potentiometer R50. If these two signals, from outputs 15 and 23, respectively are of equal amplitude and opposite phase they cancel each other at the base of Q17. The signal from the collector of Q17 is amplified by Q18 to provide the final output. Thus, in the manner described above, a 1.0–2.65 MHz bandpass filter is provided. The result is that the outputs from all three filters 14, 16 and 24 are all in phase and all have equal and identical time delays for every frequency component.

The time delay through each of the bandpass filters is related directly to the cut-off frequency. If the cut-off frequency is low, and hence the inductors and capacitors have large values, the time delay of the filter is large. For high frequency filters the inductances and capacitances are small and the result is very small time delay.

For example, as previously stated, in the embodiment described, 0–0.3 MHz filter 14 has associated with it a 1.515 microsecond delay, the 0.3–1.0 MHz filter 16 has a 0.450 microsecond delay. As explained above, in order to have equal time delays between the outputs of these filters it is necessary to introduce additional time delay in the 0.3–1.0 MHz bandpass circuit so that the total time delay of each channel is the same.

This delay is provided by means of a one microsecond delay line DL1 plus a delay provided by a tapped line DL2. DL2 is adjusted so that the total delay is approximately 1.165 microseconds. The delayed signals are then sent via transistor Q7 to the 0–1.0 MHz filter 16 through resistor R37.

In a similar manner, the 0–2.65 filter 24 has associated with it a 0.170 microsecond delay. Thus, the total of approximately 0.280 microseconds additional delay is required in the 1.0–2.65 bandpass circuit to match the other channels. This is provided by a combination of delays including the delay provided by DL1, the tap delay line DL2 and a 0.25 microsecond delay from delay line DL3. This delayed signal is then sent through the collector of Q9 to the 0–2.65 MHz filter 24.

One of the problems in video systems is that one has to have a very good DC response to prevent video sag in the picture. In order to achieve this, this circuit is almost entirely DC coupled. To achieve this, certain voltage levels must be maintained within the circuit requiring the use of voltage regulator 60. A pre-amp and level control circuit 62 is also provided.

Filters 14, 16 and 24 are Bessell function filters having a linear phase shift versus frequency characteristics far out into the stop band. This is necessary because of the requirement in video application that all the frequency components arrive exactly at the same time, i.e., linear phase condition.

The accuracy of the components used in the filters are plus and minus 5 percent. The standard accuracy of the fixed delay lines is plus and minus 5 percent. To keep the delays accurately together means to adjust for these variations is required and taht is the reason for the tapped delay line DL2. When first turned, the tapped delay line DL2 is adjusted so that the total delay for each channel comes out exactly the same.

Figure 4:
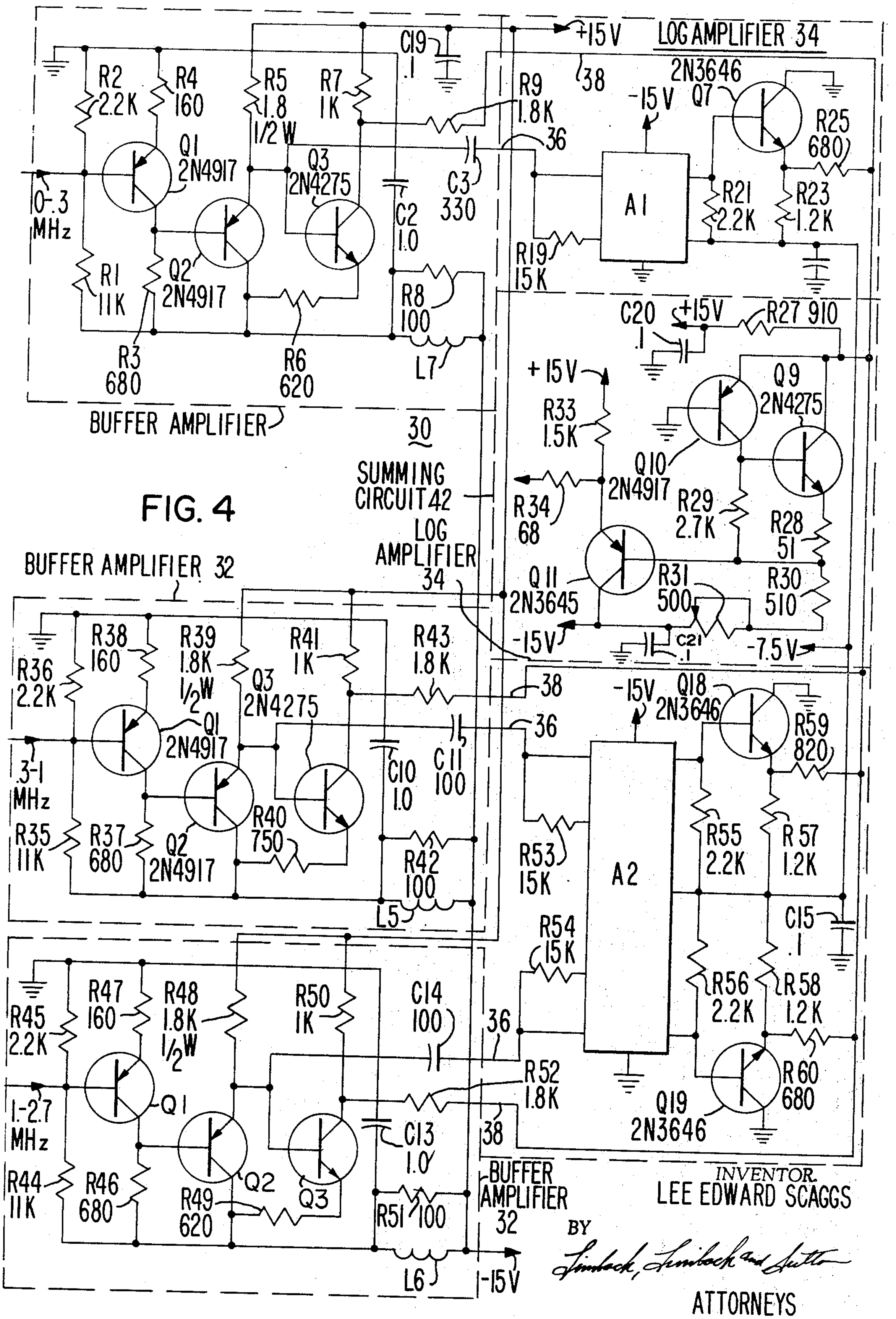
FIG. 4 is a detailed schematic diagram of one operative embodiment of the logarithmic compressor circuit shown generally in FIG. 1.
Figure 5A:
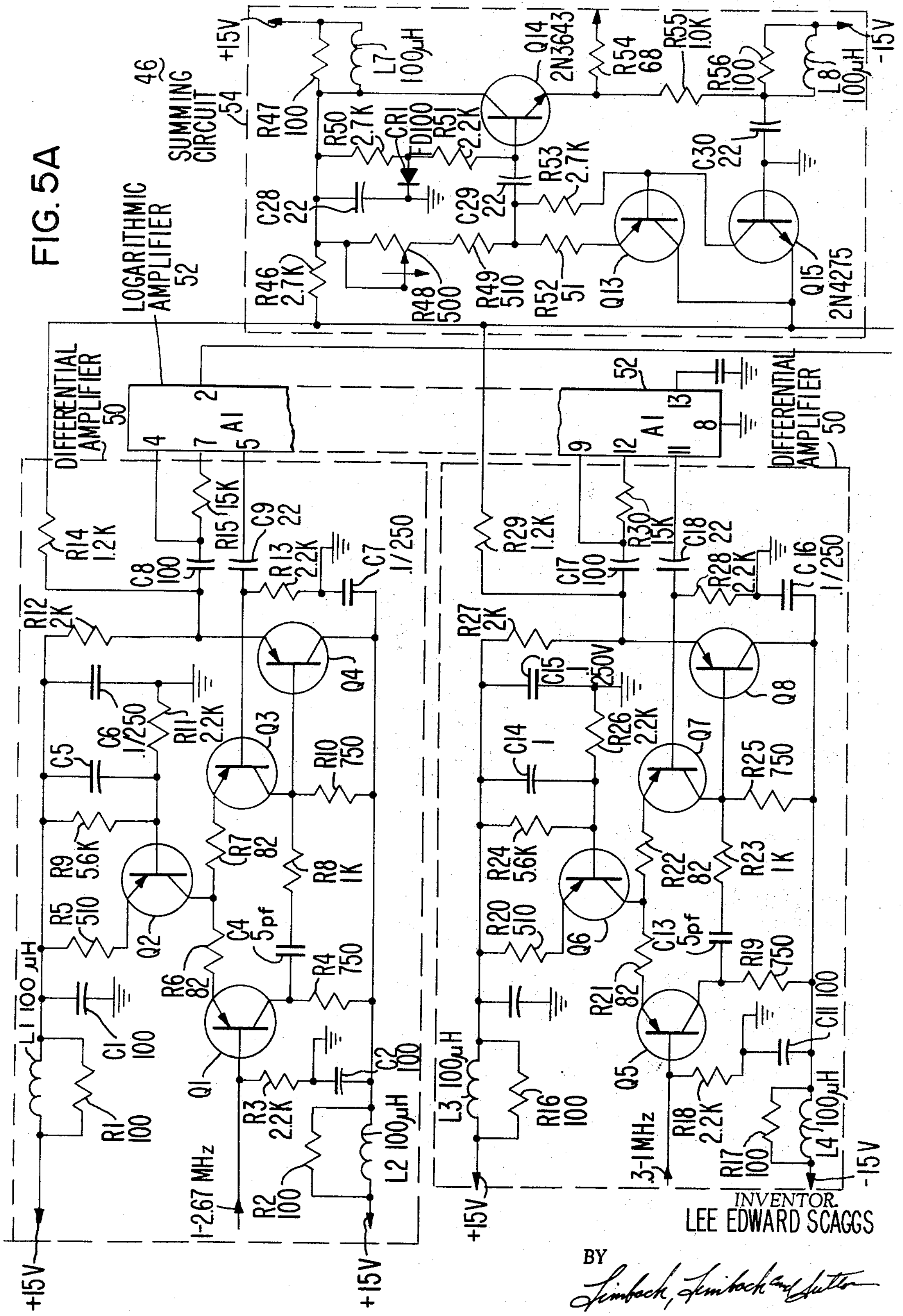
FIG. 5A and 5B are detailed schematic diagrams of the expander circuit shown generally in FIG. 2.
Figure 5B:
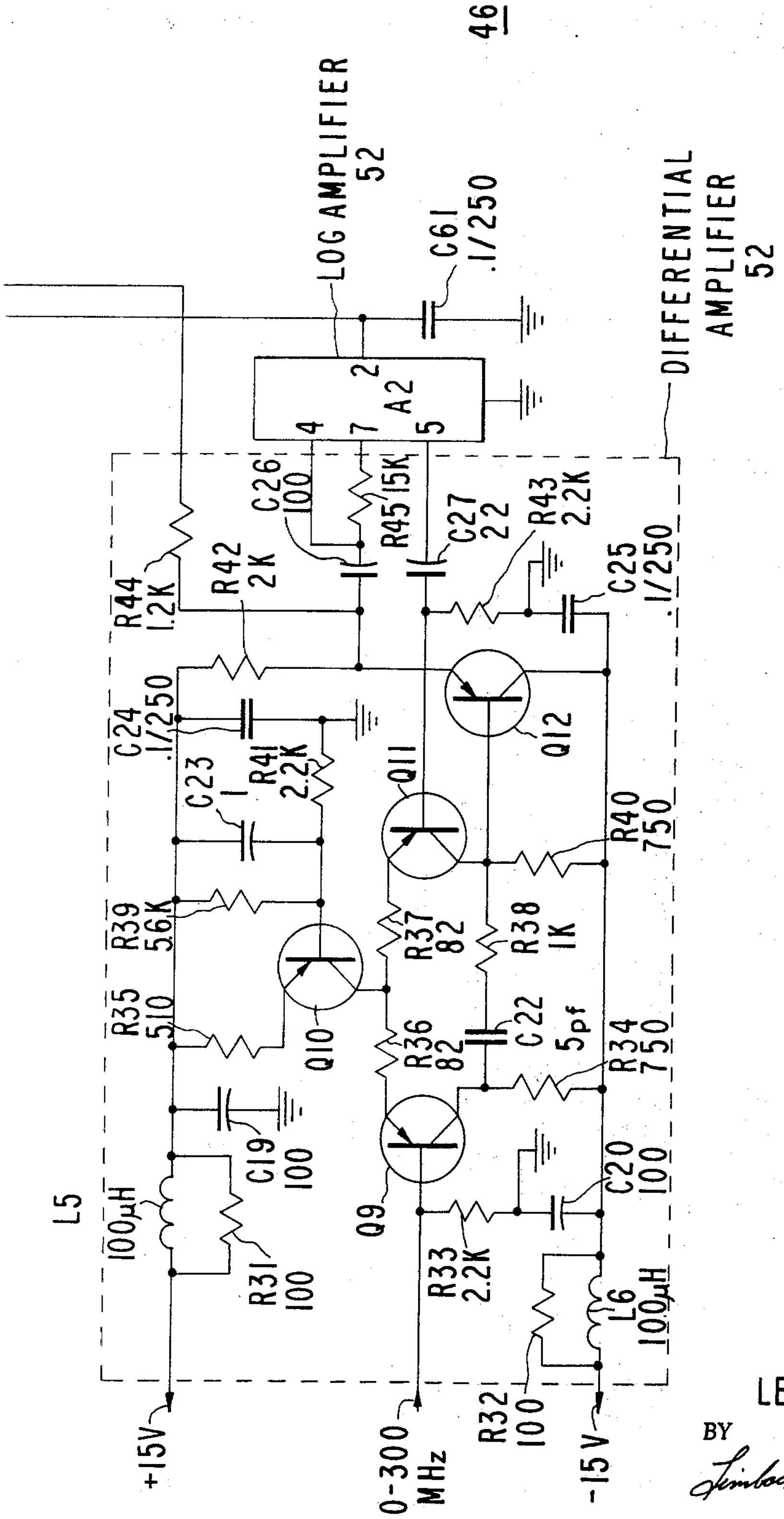

Referring now to FIG. 4 summing circuit or amplifier 42 includes transistor Q10, a common base amplifier which is used as the summing point for all of the outputs from log amplifiers 34. In particular, currents from the different compressor channels are summed at the emitter of Q10. A perfect summing point would have 0 impedance so that there would be no input voltage fluctuation since voltage fluctuation caused by one input signal modifies the input signal from another. Input impedance stability is further enhanced by a boot strap circuit where the collector current from Q9 is then fed back to the emitter of Q10.

Each of the buffer amplifiers 32 includes transistors Q1, Q2 and Q3 forming an amplifier with a gain of 4. The buffer amplifier 32 provides one output in a direct path 38 to the emitter of Q10 (summing point) through R9. It also provides an output 36 to the logarithmic amplifier 34. The output of the log amplifier 34 is then fed through the emitter follower transistor Q7 and to the summing circuit 42 through R25.

The component values and amplifier gains of the circuit are selected so that at very low signal levels, in the order of −40db to −42db (with maximum level signals at 0db), the current through each log amplifier 34 is approximately four times the current directly from the respective buffer amplifier 32. Thus, low level signals have a 12db gain increase through the log amplifier 34. For high level signals, for example, those near 0–db, the gain through the log amplifier has dropped to a very small fractional value of the total current to the emitter of Q10 and the principal source then of current to the emitter of Q10 is the direct source from buffer amplifier 32 through the resistor R9. The operation of each of the three bandpass circuit channels in this respect is the same.

The logarithmic pre-emphasis of low level signals in the embodiment disclosed takes the form of raising the level of low level signals. It is referred to as compression because the total dynamic range of the input signals is reduced by taking the low level signals and increasing them by 12db. If we assume for example that the input signal had an original range from 0db to −42db, the output now will only be from 0db to −30db. Thus the dynamic range of the signal has been compressed.

Referring now to FIG. 5, the de-emphasis or expander circuit 46 comprises three separate channels, one for each of the three bandpasses. The outputs of each channel is at circuit 54 which includes transistor Q13 and Q15. Each channel includes differential amplifier 50 which is provided in the feedback path of log amplifier 52. This circuit provides the inverse function of the log amp and, therefore expands the dynamic range of each passband. Thus, in this circuit the low level signals are decreased relative to the high amplitude signals. The reason for this is that at low levels the gain around the feedback loop through the log amplifier 52 is four. At very high signal levels, the log amplifier gain drops to a small fraction and, therefore, the feedback is very small and almost full gain is utilized from the differential amplifier 50. Thus, if the dynamic range at the input to the expander circuit 46 is 0 to −30db the range at the output is 0 to −42db, which corresponds to the original dynamic range before entering the noise reduction.

The noise reduction system of the present invention has the advantage over prior art systems in that it has the ability to reproduce transients without a recovery problem. With logarithmic amplification, it also provides smoother compression as compared with, for example, prior art systems using clipping or limiting circuits. This results in less harmonic components being generated. The use of logarithmic compression also makes it easier to more accurately expand the transmitted signals back to their original levels.

By providing a direct path from each buffer amplifier 32 around each logarithmic amplifier 34 in the compressor circuits the use of low gain amplifiers in the configuration shown for the expanders is allowed. This gives the circuit more stability and provides less phase shift through the channel than would be the case if high gain amplifiers were required.

In the embodiment described, the band splitter was used to divide the incoming signals into a plurality of independent and mutually exclusive channels or subbands. In practice, there may be situations where it is not desirable or required that mutually exclusive subbands be provided. Thus, for example, the sub-bands can, in some applications, have overlapping frequencies.

Suppose, for example it is desired that bandsplitter 12 provide the following channels:

0 – 0.3 MHz 0.3 – 1.0 MHz
0.3 – 2.65 MHz

To accomplish this, the input to amplifier 28 (FIG. 1) which is connected to the output of filter 16, is disconnected and is connected to the output of filter 14.

What is claimed is:

1. System for reducing noise introduced along a transmission path comprising:

a. first means for splitting input signals into a plurality of sub-band signals to be transmitted along said transmission path into a plurality of different frequency channels, and wherein the signal components within each channel have equal time delays with respect to signals in each of the other channels;

b. means forming a part of each of said channels for pre-emphasizing low level signal components within each of said channels;

c. means for summing the pre-emphasized signal components from each channel for transmission along said transmission path;

d. second means for splitting the signals transmitted along said transmission path into the same channels as said first means, and wherein the signal components within each channel have equal time delays with respect to signals in each of the other channels;

e. means for de-emphasizing low level signal components within each of said channels provided by said second means;

f. means for summing the de-emphasized signals from each channel to provide a substantially reconstituted output signal of said input signal, and g. wherein said pre-emphasis means comprises a logarithmic amplifier circuit for each channel for increasing logarithmically the amplitude of lower level signals relative to higher level signals within each channel, said logarithmic amplifier circuit comprising a logarithmic amplifier and a linear path and wherein the output of said logarithmic amplifier circuit and said linear path are summed together and said de-emphasizing means comprises a second circuit for decreasing logarithmically the level of lower level signals relative to higher level signals, said second circuit being substantially the complement of said first circuit.

2. Noise reduction system as in claim 1 wherein said second circuit comprises a function generating circuit for each channel and wherein each function generating circuit comprises a differential amplifier, a logarithmic amplifier, and wherein said logarithmic amplifier is in the feedback path of said differential amplifier, whereby said function generating circuit provides an output which is the inverse of said first circuit.

3. Noise reduction system as in claim 2 wherein said first circuit comprises a logarithmic amplifier circuit for each channel, and wherein each logarithmic amplifier circuit comprises a logarithmic amplifier and a linear path and wherein the output of said logarithmic amplifier circuit and said linear path are summed together.

4. Noise reduction system as in claim 3 wherein each of said logarithmic amplifier circuits includes a buffer amplifier having an input for receiving channel signals and having one output to said logarithmic amplifer and having a second output to said logarithmic amplifier linear path.

5. System as in claim 3 wherein said first and second means each comprises a plurality of passband circuits comprising:

a. a plurality of low pass filter circuits with successive filter circuits having a higher cut-off frequency and each having a different time delay associated therewith;

b. delay means for selected passband circuits so that the total delay time associated with each passband is substantially the same , and c. a plurality of means each for summing the output signals from a pair of said low pass filter circuits, said summing means arranged so that substantially no output is provided therefrom at frequencies with the frequency range common to both filters.

6. System as in claim 5 wherein said summing means sums the output signals from the low pass filter circuit having the next lowest cut-off frequency.

7. System as in claim 3 wherein said first and second means comprise:

a. a plurality of n passband circuits for providing $n$ passbands;

b. said first passband circuit comprising a first filter circuit having a passband characteristic of substantially $f_o$ to $f_l$; and c. said remaining passband circuits each comprising i. a low pass filter having a passband of $f_o$ to $f_m$, where $f_m$ is different for each filter, ii. delay means associated with said passband circuits so that the time delay associated with each of the passband circuits is substantially the same, and iii. a summing circuit having two inputs, one input connected with the output of the low pass filter in its passband circuit, and the second input connected to the output of the low pass filter in another passband circuit having a narrower passband, said summing circuit being arranged so that the output from said summing circuit includes the frequency range above the cut-off frequency of the narrower low pass filter from the other passband circuit and below the cut-off frequency of the broader low pass filter forming a part of the same passband circuit as said summing circuit.

8. System as in claim 7 wherein said $n$ passband channels are substantially adjacent and mutually exclusive and wherein said second input of said summing circuit is connected to the low pass filter having the next narrowest passband.

9. System for reducing noise introduced along a transmission path comprising:

a. first means for splitting input signals into a plurality of sub-band signals to be transmitted along said transmission path into a plurality of different frequency channels, and wherein the signal components within each channel have equal time delays with respect to signals in each of the other channels;

b. means forming a part of each of said channels for pre-emphasizing low level signal components within each of said channels;

c. means for summing the pre-emphasized signal components from each channel for transmission along said transmission path;

d. second means for splitting the signals transmitted along said transmission path into the same channels as said first means, and wherein the signal components within each channel have equal time delays with respect to signals in each of the other channels;

e. means for de-emphasizing low level signal components within each of said channels provided by said second means;

f. means for summing the de-emphasized signals from each channel to provide a substantially reconstituted output signal of said input signal, and g. wherein said first and second means each comprise a plurality of passband circuits comprising a plurality of low pass filter circuits with successive filter circuits having a higher cut-off frequency and each having a different time delay associated therewith;

delay means for selected passband circuits so that the total delay time associated with each passband is substantially the same, and a plurality of means each for summing the output signals from a pair of said low pass filter circuits, said summing means arranged so that substantially no output is provided therefrom at frequencies with the frequency range common to both filters.

10. System as in claim 9 wherein said summing means sums the output signals from the low pass filter circuit having the next lowest cut-off frequency.

11. System for splitting signals covering a band of frequencies into a plurality of independent sub-bands wherein the signal components within each sub-band are subjected to equal time delay with respect to signal components in each of the other sub-bands, comprising:

a. a plurality of n passband circuits for providing $n$ passbands;

b. said first passband circuit comprising a first low-pass filter circuit having a passband characteristic of substantially $f_o$ to $f_l$; and c. said remaining passband circuits each comprising i. a low pass filter having a passband of $f_o$ to $f_m$, where $f_m$ is different for each filter;

ii. delay means associated with said passband circuits so that the time delay associated with each of the passband circuits is substantially the same, and iii. a summing circuit having one input connected with the low pass filter in its passband circuit and having a second input connected to a low pass filter having a narrower passband in another passband circuit, said summing circuit and the inputs thereto being arranged so that an output is provided from said summing circuit in the frequency range above the cut-off frequency of the narrower low pass filter and below the cut-off frequency of the broader low pass filter.

12. System as in claim 11 wherein said n channels are substantially adjacent and mutually exclusive and wherein said second input of said summing circuit is connected to the low pass filter having the next narrowest passband.

13. System for splitting signals covering a band of frequencies into a plurality of independent sub-bands wherein the signal components within each sub-band are subjected to equal time delay with respect to signal components in each of the other sub-bands, comprising a plurality of passband circuits comprising:

a. a plurality of low pass filter circuits with successive filter circuits having a higher cut-off frequency and each having a different time delay associated therewith;

b. delay means for selected passband circuits so that the total delay time associated with each passband is substantially the same, and c. a plurality of means each for summing the output signals from a pair of said low pass filter circuits, said summing means arranged so that substantially no output is provided therefrom at frequencies within the frequency range common to both filters.

14. System as in claim 13 wherein said summing means sums the output signals from the low pass filter circuit having the next lowest cut-off frequency.

15. A system for preferentially emphasizing selected portions of an incoming signal comprising:

a. means for splitting incoming signals into a plurality of different frequency channels, and wherein the signal components within each channel have equal time delays with respect to signals in each of the other channels;

b. means forming a part of each of said channels for pre-emphasizing low level signal components within each of said channels, said pre-emphasis means comprising a logarithmic amplifier circuit for each channel for increasing logarithmically the amplitude of lower level signals relative to higher level signals within each channel, said logarithmic amplifier circuit comprising a logarithmic amplifier and a linear path and wherein the output of said logarithmic amplifier circuit and said linear path are summed together and means for summing the pre-emphasized sub-band signals to provide an output signal.

16. A system as in claim 15 wherein said splitting means comprises a plurality of passband circuits comprising:

a. a plurality of low pass filter circuits with successive filter circuits having a higher cut-off frequency and each having a different time delay associated therewith;

b. delay means for selected passband circuits so that the total delay time associated with each passband is substantially the same; and c. a plurality of means each for summing the output signals from a pair of said low pass filter circuits, said summing means arranged so that substantially no output is provided therefrom at frequencies within the frequency range common to both filters.

17. A system as in claim 16 wherein said summing means sums the output signals from the low pass filter circuit having the next lowest cut-off frequency.

18. A system for preferentially de-emphasizing selected portions of an incoming signal comprising:

a. means for splitting said incoming signals into a plurality of different frequency channels, and wherein the signal components within each channel have equal time delays with respect to signals in each of the other channels;

b. means forming a part of each of said channels for de-emphasizing low level signal components within each of said channels, said de-emphasis means comprising a function generating circuit for each channel for decreasing logarithmically the level of lower level signals relative to higher level signals, said function generating circuit comprising a differential amplifier, a logarithmic amplifier, and wherein said logarithmic amplifier is in the feedback path of said differential amplifier; and c. means for summing the de-emphasized signals from each channel to provide an output signal.

19. A system as in claim 18 wherein said splitting means comprises a plurality of passband circuits comprising:

a. a plurality of low pass filter circuits with successive filter circuits having a higher cut-off frequency and each having a different time delay associated therewith;

b. delay means for selected passband circuits so that the total delay time associated with each passband is substantially the same, and c. a plurality of means each for summing the output signals from a pair of said low pass filter circuits, said summing means arranged so that substantially no output is provided therefrom at frequencies within the frequency range common to both filters.

20. System as in claim 19 wherein said summing means sums the output signals from the low pass filter circuit having the next lowest cut-off frequency.

21. System for reducing noise introduced along a transmission path comprising:

a. first means for splitting input signals into a plurality of sub-band signals to be transmitted along said transmission path into a plurality of different frequency channels, and wherein the signal components within each channel have equal time delays with respect to signals in each of the other channels;

b. means forming a part of each of said channels for pre-emphasizing low level signal components within each of said channels;

c. means for summing the pre-emphasized sub-band signal components from each channel for transmission along said transmission path;

d. second means for splitting the signals transmitted along said transmission path into the same channels as said first means, and wherein the signal components within each channel have equal time delays with respect to signals in each of the other channels;

e. means for de-emphasizing low level signal components within each of said channels provided by said second means;

f. means for summing the de-emphasized signals from each channel to provide a substantially reconstituted output signal of said input signal; and g. wherein said first and second means comprise a plurality of $n$ passband circuits for providing $n$ passbands, said first passband circuit comprising a first low pass filter circuit having a passband characteristic of substantially $f_o$ to $f_l$, and said remaining passband circuits each comprising i. a low pass filter having a passband of $f_o$ to $f_m$, where $f_m$ is different for each filter, ii. delay means associated with said passband circuits so that the time delay associated with each of the passband circuits is substantially the same, and iii. a summing circuit having two inputs, one input connected with the output of the low pass filter in its passband circuit, and the second input connected to the output of the low pass filter in another passband circuit having a narrower passband, said summing circuit being arranged so that the output from said summing circuit includes the frequency range above the cut-off frequency of the narrower low pass filter from the other passband circuit and below the cut-off frequency of the broader low pass filter forming a part of the same passband circuit as said summing circuit.

22. A system as in claim 21 wherein said n passband channels are substantially adjacent and mutually exclusive and wherein said second input of said summing circuit is connected to the low pass filter having the next narrowest passband.

* * * * *